United States Patent
Bono

(10) Patent No.: US 11,042,448 B2
(45) Date of Patent: Jun. 22, 2021

(54) ARCHIVING NAS SERVERS TO THE CLOUD

(71) Applicant: EMC IP Holding Company LLC, Hopkinton, MA (US)

(72) Inventor: Jean-Pierre Bono, Westborough, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 580 days.

(21) Appl. No.: 15/884,687

(22) Filed: Jan. 31, 2018

(65) Prior Publication Data
US 2019/0235968 A1    Aug. 1, 2019

(51) Int. Cl.
*G06F 11/14*        (2006.01)
*H04L 29/08*        (2006.01)
*G06F 16/27*        (2019.01)

(52) U.S. Cl.
CPC ........ *G06F 11/1464* (2013.01); *G06F 16/275* (2019.01); *H04L 67/1095* (2013.01); *H04L 67/1097* (2013.01); *G06F 2201/84* (2013.01)

(58) Field of Classification Search
CPC .. G06F 2201/84; G06F 11/1451; G06F 3/067; G06F 16/1827; G06F 11/1458; G06F 11/1464; G06F 11/1446; G06F 11/1448
USPC .......... 707/600–831, 899, 999.001–999.206
See application file for complete search history.

(56) References Cited

U.S. PATENT DOCUMENTS

| | | | |
|---|---|---|---|
| 7,099,957 B2 | 8/2006 | Cheline et al. | |
| 7,213,124 B2 | 5/2007 | Serizawa et al. | |
| 7,383,463 B2 | 6/2008 | Hayden et al. | |
| 7,529,785 B1 * | 5/2009 | Spertus | G06F 11/1453 |
| 7,562,216 B2 | 7/2009 | Borthakur et al. | |
| 7,631,155 B1 | 12/2009 | Bono et al. | |
| 7,739,312 B2 | 6/2010 | Gordon et al. | |
| 7,769,722 B1 | 8/2010 | Bergant et al. | |
| 7,873,700 B2 | 1/2011 | Pawlowski et al. | |
| 8,301,798 B2 | 10/2012 | Mond et al. | |
| 8,554,808 B2 | 10/2013 | Fukatani et al. | |
| 8,892,631 B2 | 11/2014 | Brown et al. | |
| 8,996,837 B1 | 3/2015 | Bono et al. | |
| 9,280,555 B1 | 3/2016 | Bono et al. | |
| 9,304,999 B1 | 4/2016 | Bono et al. | |
| 9,305,009 B1 | 4/2016 | Bono et al. | |
| 9,378,219 B1 | 6/2016 | Bono et al. | |
| 9,389,932 B2 * | 7/2016 | Fang | G06F 9/544 |

(Continued)

OTHER PUBLICATIONS

EMC® Cloud Tiering Appliance and Cloud Tiering Appliance/VE, Version 12.0 Getting Started Guide; Jul. 2017; 141 pages.

(Continued)

*Primary Examiner* — Angelica Ruiz
(74) *Attorney, Agent, or Firm* — BainwoodHuang

(57) ABSTRACT

A technique for archiving NAS (network attached storage) servers includes replicating multiple locally-backed volumes, which support respective file systems of a NAS server, to respective cloud-backed volumes backed by a cloud-based data store. After replication has updated the cloud-backed volumes with contents from the locally-backed volumes, the technique further includes performing a group snapshot operation on the cloud-backed volumes. The group snapshot operation creates a point-in-time version of the cloud-backed volumes, which provides a replica of the NAS server archived in the cloud.

20 Claims, 7 Drawing Sheets

(56) References Cited

U.S. PATENT DOCUMENTS

| | | |
|---|---|---|
| 9,424,117 B1 | 8/2016 | Bono et al. |
| 9,497,103 B2 | 11/2016 | Williams et al. |
| 9,507,787 B1 | 11/2016 | Bono et al. |
| 9,535,630 B1 | 1/2017 | Bono et al. |
| 10,140,188 B2* | 11/2018 | Wallace ............... G06F 11/1076 |
| 2010/0174811 A1 | 7/2010 | Musiri et al. |
| 2010/0241731 A1 | 9/2010 | Du et al. |
| 2012/0016838 A1 | 1/2012 | Arai et al. |
| 2014/0006354 A1* | 1/2014 | Parkison ................ G06F 3/067 707/649 |
| 2014/0108351 A1* | 4/2014 | Nallathambi ....... G06F 11/1464 707/639 |
| 2014/0181441 A1* | 6/2014 | Kottomtharayil ..... G06F 3/0649 711/162 |
| 2014/0201150 A1* | 7/2014 | Kumarasamy ...... G06F 11/1402 707/639 |
| 2015/0269213 A1 | 9/2015 | Avati |
| 2016/0036623 A1* | 2/2016 | Clarkson ............. G06F 11/3495 714/4.11 |
| 2016/0179826 A1 | 6/2016 | Batra |
| 2017/0185605 A1 | 6/2017 | Higuchi et al. |
| 2017/0262350 A1* | 9/2017 | Dornemann ........ G06F 9/45558 |
| 2017/0344618 A1* | 11/2017 | Horowitz ............ G06F 16/2365 |
| 2018/0060062 A1* | 3/2018 | Sampson ............ G06F 11/3051 |
| 2019/0108231 A1* | 4/2019 | Patterson .............. G06F 16/128 |
| 2019/0213265 A1 | 7/2019 | Boerner et al. |

OTHER PUBLICATIONS

EMC® VNX™ Series Release 7.0 Configuring Virtual Data Movers on VNX™; Feb. 2011; 80 Pages.
EMC VNX Snapshots; Dec. 2013; 57 pages.
EMC VNX Replication Technologies; Nov. 2015; 34 pages.
Dell EMC Cloudarray: Cloud-Intergrated Storage; 3 pages.
VMAX3 and VMAX All Flash With Cloudarray Hypermax OS Integration with CloudArray; Sep. 2016; 11 pages.
Dell EMC Unity: Cloud Tiering Appliance (CTA) A Detailed Review; Nov. 2017; 29 pages.
Using EMC® Celerra Replicator™ (V2); Feb. 2009; 184 pages.
"Configuring NFS on VNX™," EMC® VNX™ Series, Release 7.1, EMC Corporation, 1998, 150 pages.
Bono, et al., "Unified Datapath Processing With Virtualized Storage Processors," U.S. Appl. No. 13/828,294, filed Mar. 14, 2013.
Bono, et al., "Providing Virtual Storage Processor (VSP) Mobility With Induced File System Format Migration," U.S. Appl. No. 14/041,097, filed Sep. 30, 2013.
Herbert Potzl, Marc E. Fluczynski; "Linux-VServer"; "Proceedings of the Linux Symposium" vol. Two; Jun. 27-30, 2007; pp. 151-160.

* cited by examiner

ARCHIVING NAS SERVERS TO THE CLOUD

BACKGROUND

Data storage systems are arrangements of hardware and software that include storage processors coupled to arrays of non-volatile storage devices, such as magnetic disk drives, electronic flash drives, and/or optical drives, for example. The storage processors service storage requests, arriving from host machines ("hosts"), which specify files or other data elements to be written, read, created, deleted, and so forth. Software running on the storage processors manages incoming storage requests and performs various data processing tasks to organize and secure the data elements stored on the non-volatile storage devices.

Some data storage systems employ cloud-based storage resources in addition to local storage. For example, EMC CloudArray supports cloud-based storage of LUNs (Logical UNits) and makes those LUNs available using conventional block-based protocols, such as iSCSI (Internet Small Computer System Interface), Fibre Channel, and the like. CloudArray supports in-cloud snapshots and is compatible with Amazon S3 (Simple Storage Services). CloudArray supports numerous cloud providers, such as Microsoft Azure, Dell EMC ECS (Elastic Cloud Storage), Virtustream, and many others, and supports both public cloud and private cloud solutions.

Some data storage systems aggregate data objects in structures known as NAS (Network Attached Storage) servers, which may also be referred to herein as virtual data movers, or "VDMs." Each NAS server is a collection of user file systems, settings, and one or more network servers, such as a CIFS (Common Internet File System) server and/or an NFS (Network File System) server, which provide host access to the user file systems. Settings may be stored within one or more file systems of the NAS servers themselves, such that NAS servers are self-contained. Many NAS servers may operate together in a single storage processor and within a single operating system environment.

SUMMARY

Unfortunately, administrators of data storage systems have had limited options for archiving and restoring NAS servers. Although administrators may replicate NAS servers across data storage systems, replication typically requires the participation of multiple data storage systems, which can be expensive for small and medium-sized customers to own and operate. In addition, restoring operation of a NAS server to a local data storage system, e.g., to achieve disaster recovery or content distribution, has required local copies to be made of all file systems of the NAS server. Such file systems may each be on the order of many terabytes. Conventional approaches to archiving and restoring NAS servers have thus involved multiple data storage systems with each requiring enough storage space to accommodate all the file systems of the NAS servers. These requirements may be outside the reach of many customers.

It has been recognized, however, that many cloud-based storage solutions are both cost effective and reliable. What is needed is a way for a data storage system to leverage the cost benefits and reliability of cloud-based storage to support the archiving and/or restoring of NAS servers.

In contrast with prior approaches, an improved technique for archiving NAS servers includes replicating multiple locally-backed volumes, which support respective file systems of a NAS server, to respective cloud-backed volumes backed by a cloud-based data store. After replication has updated the cloud-backed volumes with contents from the locally-backed volumes, the technique further includes performing a group snapshot operation on the cloud-backed volumes. The group snapshot operation creates a point-in-time version of the cloud-backed volumes, which provides a replica of the NAS server archived in the cloud.

In some examples, replication proceeds over time and additional group snapshot operations are performed, preserving multiple point-in-time replicas of the NAS server and tracking changes in the file systems of the NAS server as they continue to evolve, e.g., in response to user activity.

As the NAS server is archived in the cloud, there is no need for the local data storage system to store the archived versions. Nor is there any need for a second data storage system to store the archived versions, as storage of archived data is achieved in the cloud.

Certain embodiments are directed to a method of archiving NAS (network attached storage) servers. The method includes receiving a request to archive a NAS server in a data storage system, the NAS server including a set of multiple file systems, each of the set of file systems of the NAS server deployed on a respective, locally-backed volume in the data storage system. In response to receiving the request, the method further includes establishing a respective replication session on each of the locally-backed volumes, each replication session designating (i) a replication source as a respective one of the locally-backed volumes and (ii) a replication target as a respective cloud-backed volume, the cloud-backed volume backed by storage in a cloud-based data store. After the replication sessions have updated the cloud-backed volumes with contents from the locally-backed volumes on which the file systems of the NAS server are deployed, the method still further includes performing a group snapshot operation, the group snapshot operation generating, at a particular point in time, a snapshot of each of the cloud-backed volumes, each snapshot providing a new volume backed by the cloud-based data store, the snapshots generated by the group snapshot operation together providing an archived, point-in-time version of the NAS server.

Other embodiments are directed to a computerized apparatus constructed and arranged to perform a method of archiving NAS servers, such as the method described above. Still other embodiments are directed to a computer program product. The computer program product includes a set of non-transient, computer-readable media that store instructions which, when executed by control circuitry of a computerized apparatus, cause the computerized apparatus to perform a method of archiving NAS servers, such as the method described above.

The foregoing summary is presented for illustrative purposes to assist the reader in readily grasping example features presented herein; however, the foregoing summary is not intended to set forth required elements or to limit embodiments hereof in any way. One should appreciate that the above-described features can be combined in any manner that makes technological sense, and that all such combinations are intended to be disclosed herein, regardless of whether such combinations are identified explicitly or not.

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same or similar parts throughout the different views.

DETAILED DESCRIPTION OF THE INVENTION

Embodiments of the invention will now be described. It should be appreciated that such embodiments are provided by way of example to illustrate certain features and principles of the invention but that the invention hereof is not limited to the particular embodiments described.

This specification is presented in two sections to assist the reader:
  Section I presents an improved technique for archiving NAS (network attached storage) servers to the cloud.
  Section II presents an improved technique for restoring NAS servers from the cloud, such as for performing disaster recovery (DR) and content distribution.
Section I: Archiving NAS Servers in the Cloud.

An improved technique for archiving NAS (network attached storage) servers includes replicating multiple locally-backed volumes, which support respective file systems of a NAS server, to respective cloud-backed volumes backed by a cloud-based data store. After replication has updated the cloud-backed volumes with contents from the locally-backed volumes, the technique further includes performing a group snapshot operation on the cloud-backed volumes. The group snapshot operation creates a point-in-time version of the cloud-backed volumes, which provides a replica of the NAS server archived in the cloud.

Figure 1:
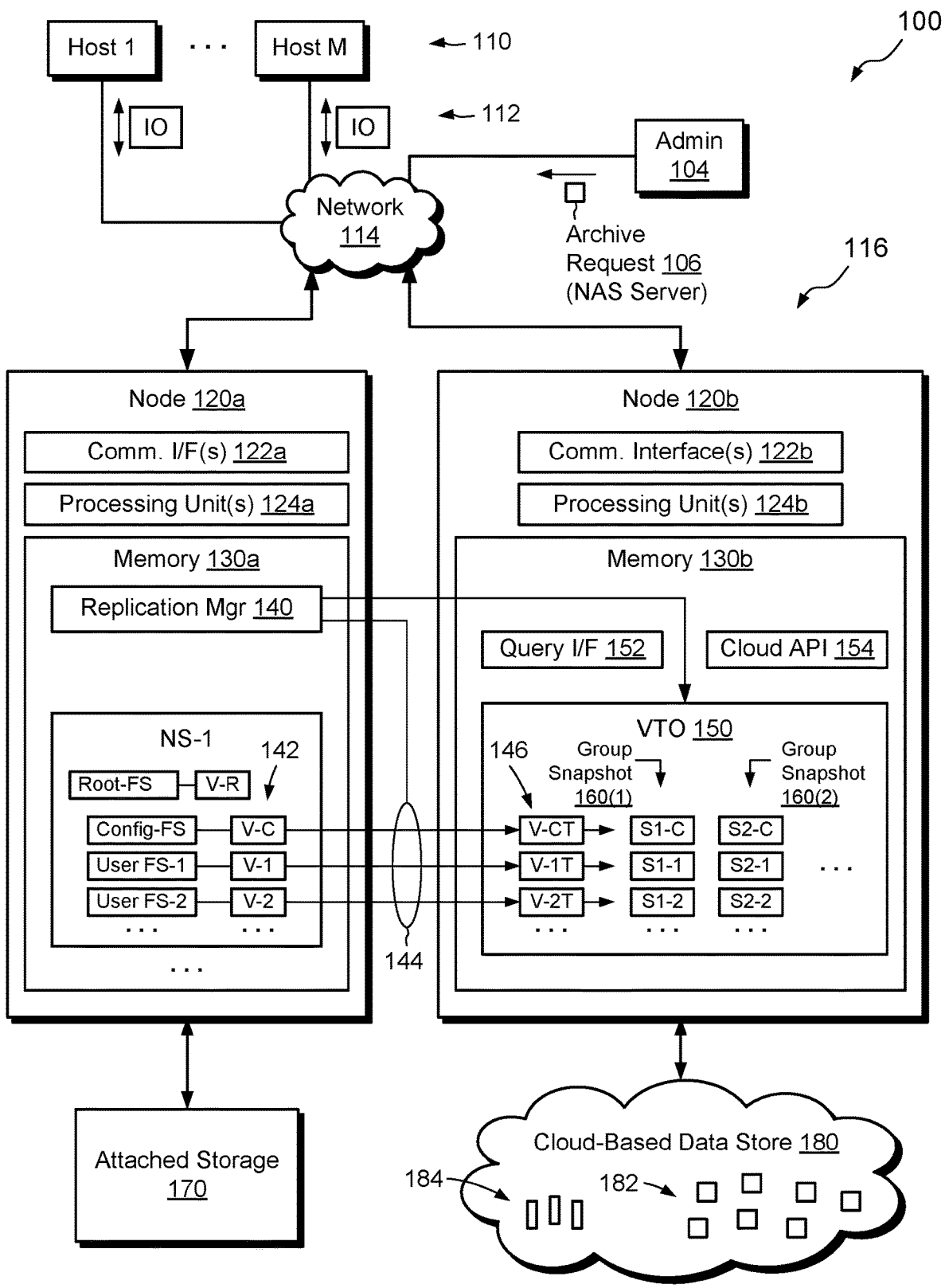
FIG. 1 is a block diagram of an example environment in which embodiments of the improved technique hereof can be practiced.

FIG. 1 shows an example environment 100 in which embodiments of the improved technique hereof can be practiced. Here, multiple host computing devices ("hosts") 110 access a data storage system 116 over a network 114. An administrative machine 104 may also connect to the data storage system 116 over the network 114. The data storage system 116 may include any number of computing nodes, with two nodes 120a and 120b specifically shown. The first node 120a is configured to process host I/O requests 112, such as read requests and write requests, and is coupled to attached storage 170, such as one or more magnetic disk drives, solid-state drives, and the like. In an example, the first node 120a is connected to the attached storage 170 using cables or via a SAN (storage area network). The second node 120b is configured to access cloud storage and is coupled to a cloud-based data store 180, e.g., over a WAN (wide area network), such as the Internet. The cloud-based data store 180 may be part of a public cloud or a private cloud and may be provided by any suitable platform, such as Amazon Cloud Services (ACS), Microsoft Azure, Dell EMC Elastic Cloud Services (ECS), and the like. In an example, the cloud-based data store 180 stores data in the form of objects 182 and supports the storage of searchable metadata elements 184. For example, the cloud-based data store 180 supports the storage of searchable blobs in which the searchable metadata elements 184 may be provided. However, the invention hereof is not limited to object-based data or to data stores that provide blobs.

Each of the nodes 120a and 120b includes a set of communication interfaces (122a or 122b), such as one or more network interface adapters for converting electronic and/or optical signals received over the network 114 to electronic form for use by the respective node. Each of the nodes 120a and 120b further includes a set of processing units (124a or 124b) and memory (130a or 130b). Each set of processing units 124a and 124b includes one or more processing chips and/or assemblies. In a particular example, each set of processing units includes numerous multi-core CPUs. Each of the memories 130a and 130b includes both volatile memory (e.g., RAM), and non-volatile memory, such as one or more ROMs, disk drives, solid state drives, and the like. In each node, the set of processing units and the memory together form control circuitry, which is constructed and arranged to carry out various methods and functions as described herein. Each of the memories 130a and 130b includes a variety of software constructs realized in the form of executable instructions. When the executable instructions are run by the respective set of processing units 124a or 124b, the set of processing units are made to carry out the operations defined by the software constructs. Although certain software constructs are specifically shown and described, it is understood that each memory typically includes many other software constructs, which are not shown, such as various applications, processes, and daemons. Further, one should appreciate that the use of two nodes 120a and 120b is merely illustrative, as the data storage system 116 may include any number of nodes, including a single node.

As further shown in FIG. 1, the memory 130a of node 120a "includes," i.e., realizes by execution of software instructions, a replication manager 140 and a NAS server (NS-1). The memory 130a may include any number of NAS servers.

The memory 130b of node 120b includes a volume-to-object (VTO) translator 150, a query interface 152, and one or more cloud APIs (application program interfaces) 154, for managing communications with the cloud-based data store 180. The VTO translator 150 is configured to compose block-based volumes from respective sets of objects 182 in the data store 180. For example, the VTO 150 may associate a first volume with a first set of the objects 182 and a second volume with a second set of the objects 182. In an example, the VTO 150 is further configured to support object sharing among volumes, such that the same object 182 may be part of multiple volumes, e.g., if the data across the volumes are identical. In an example, the VTO 150 is still further configured to support snapshot operations. For instance, the VTO 150 may generate a snapshot of a volume as a point-in-time version of that volume. Owing to the above-described sharing, the volume and its snapshot may share most if not all of the objects that support them. The VTO translator 150 preferably stores mapping structures for organizing data of volumes in objects 182, as well as the data itself. A suitable VTO translator that includes these features is commercially available from Dell EMC of Hopkinton, Mass., as part of the CloudArray appliance.

The query interface 152 is configured to provide a vehicle for querying the data store 180 based on searchable metadata elements 184. For example, the VTO translator 150 associates each of the searchable metadata elements 184 with a corresponding volume. For instance, a different searchable metadata element 184 may be provided for each volume managed by the VTO translator 150. As will be described, the searchable metadata elements 184 include information that identifies NAS servers and versions thereof to which particular volumes belong.

In example operation, node 120*a* in the data storage system 116 receives I/O requests 112 from hosts 110. The I/O requests 112 include read requests and/or write requests directed to user file systems in NAS servers running on node 120*a*, such as NS-1. As shown, NS-1 includes a collection of file systems, which may belong to a particular organization or group, such as HR (human resources) or accounting, for example. However, NAS servers may be used for any purpose. NS-1 is seen to include a root file system "Root-FS," a configuration file system "Config-FS," and any number of user file systems, such as "User FS-1" and "User FS-2." The root file system Root-FS stores local configuration settings, such as network settings and network server information, and a file system database (FSDB) of file systems that belong to the NAS server. The configuration file system Config-FS stores global configuration data, and the user file systems store user data. In general, the data storage system 116 manages the Root-FS and Config-FS internally and provides host access to the user file systems only. In an example, NS-1 is a virtual data mover, meaning that it acts as a type of virtualized storage processor in the sense that it include not only data, but also network server settings. For example, each NAS server in a data storage system 116 may have its own IP (Internet protocol) address, its own DNS (Directory Name Service) settings, and so forth. NAS servers should not be confused with virtual machines, however. For example, multiple NAS servers may run in the context of a single operating system instance.

As FIG. 1 further shows, the file systems in NS-1 are deployed upon respective locally-backed volumes. A file system is "deployed" upon a volume in the sense that the volume stores the data and metadata of the file system, e.g., all of its files, directories, and internal mapping structures, such that a suitably-configured processing node may operate the file system based on the contents of the volume. In NS-1, Root-FS is deployed upon volume V-R, Config-FS is deployed upon volume V-C, and user file systems FS-1 and FS-2 are deployed upon volumes V-1 and V-2, respectively. The volumes V-R, V-C, V-1, and V-2 are "locally backed," as their contents are stored in attached storage 170, e.g., in local disk drives.

At some point during operation, the administrative machine 104 issues an archive request 106, which specifies a particular NAS server to be archived, such as NS-1. Alternatively, the archive request 106 may arrive from a different machine or may be generated internally by the data storage system 116. In response to the archive request 106, the node 120*a* directs the replication manager 140 to start replicating NS-1. To this end, the replication manager 140 create replication sessions 144 on each of the volumes 142 supporting the file systems of NS-1 (an exception may be the volume supporting Root-FS, as Root-FS stores local configuration data that may be regenerated later). For example, the replication manager 140 configures volumes 142 (e.g., V-C, V-1, and V-2) as replication sources and directs the VTO translator 150 in node 120*b* to allocate cloud-backed volumes 146, i.e., volumes V-CT, V-1T, and V-2T, and configures these volumes as replication targets.

The replication sessions 144 then proceed by synchronizing the contents of cloud-backed volumes 146 (e.g., V-CT, V-1T, and V-2T) with those of locally-backed volumes 142 (e.g., V-C, V-1, and V-2, respectively). For example, the replication manager 140 may direct a bulk copy of V-C to V-CT, of V-1 to V-1T, and of V-2 to V-2T. Additional replication activities may proceed over time, sending changes in locally-backed volumes 142 to corresponding cloud-based volumes 146, so as the keep the cloud-based volumes current, or nearly current, with the locally-backed volumes 142.

At some point, after the VTO translator 150 has updated the cloud-backed volumes 146 with contents of the respective locally-backed volumes 142, such as after the initial copy or after any update, the replication manager 140 directs the VTO translator 150 to perform a group snapshot operation 160(1). The group snapshot operation 160(1) creates a cloud-backed snapshot of the each of the volumes 146. For example, operation 160(1) creates a snapshot S1-C of V-CT, creates a snapshot S1-1 of V-1T, and creates a snapshot S1-2 of V-2T. Each of the snapshots S1-C, S1-1, and S1-2 is itself backed in the cloud, i.e., backed by objects 182 in the cloud-based data store 180.

When VTO translator 150 performs the group snapshot operation 160(1), it also generates new searchable metadata elements 184, e.g., one metadata element for each snapshot (volume) created. Each new metadata element 184 identifies the NAS server (NS-1) and includes a version number, which identifies a version of the NAS server. For example, version number "1" identifies a first version, corresponding to the first group snapshot operation 160(1).

Additional group snapshot operations may occur later, after additional replication-induced updates to cloud-backed volumes 146 have been performed. For example, VTO translator 150 may perform group snapshot operation 160(2) at a later point in time to capture the state of volumes 146 at such later time, producing snapshots S2-C, S2-1, and S2-2 from cloud-backed volumes V-CT, V-1T, and V-2T, respectively. Generation of new metadata elements 184 accompanies each new group snapshot operation, again on a per-snapshot (volume) basis. Metadata elements 184 produced for group snapshot operation 160(2) may identify the same NAS server as those generated for group snapshot operation 160(1), but have a new version number, e.g., "2," as they are generated as part of the second group snapshot operation 160(2).

Operation may proceed in this manner indefinitely, generating new group snapshots of cloud-backed volumes 146, which act as replicas of locally-backed volumes 142, effectively archiving different versions of NS-1 in the cloud-based data store 180. One may restore any desired version of NS-1 from the cloud-based data store 180 by operating the query interface 152 to identify the particular snapshots of a desired version of NS-1 and then making those snapshots available to the node 120*a* (or to any similarly configured node).

In an example, the replication manager 140 controls not only replication sessions 144 but also the timing of group snapshot operations 160(1) and 160(2). Some coordination may be desired, for example, to ensure that the VTO translator 150 performs group snapshot operations only after cloud-backed volumes 146 have been updated in a consistent manner. For example, cloud-backed volumes 146 should ideally reflect the states of locally-backed volumes 142 at the same point in time. In addition, and along similar lines, each group snapshot operation should ideally reflect the states of cloud-backed volumes 146 at the same point in time. For example, replication sessions 144 may be paused until all snapshots in a group snapshot operation have been generated, or replication may proceed periodically, or episodically, with each group snapshot operation performed after one set of updates to all volumes 146 has been completed but before a next set of updates has begun.

Figure 2:
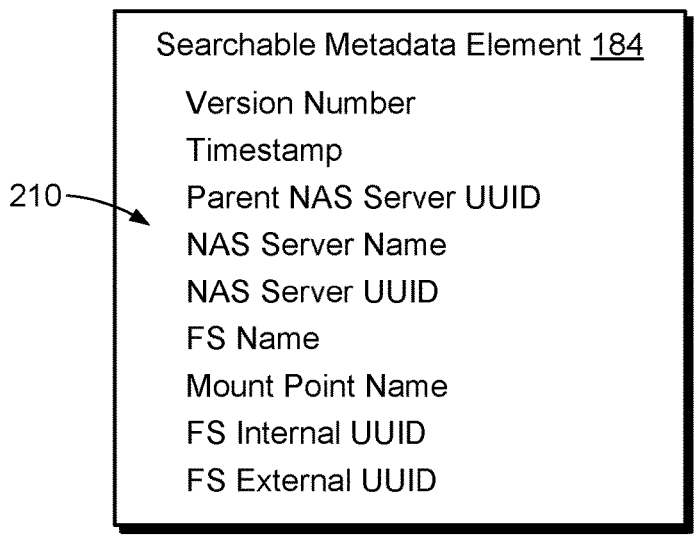
FIG. 2 is a diagram showing example contents of a searchable metadata element of FIG. 1.

FIG. 2 shows example information 210 that the VTO translator 150 may store in a searchable metadata element 184. The information 210 may be stored as different fields or in any suitable way, which may depend upon the features provided by the particular type of cloud-based data store 180 being used. In an example, a different searchable metadata element 184 is created for each snapshot generated pursuant to a group snapshot operation. In a non-limiting example, each searchable metadata element 184 includes the following information:

- Version Number. A number that is incremented with each group snapshot operation and indicates a version number of this NAS server.
- Timestamp. A time and date when the group snapshot operation producing this snapshot was performed.
- Parent NAS server UUID. A name of the NAS server from which this version was created. NS-1 in the current example.
- NAS server Name. The name of this NAS server version. May be the same as the parent NAS server name or may be different if separately assigned.
- NAS server UUID. A universally unique identifier of this NAS server version.
- FS Name. A name of the file system to which the snapshot corresponds. For example, "User FS-1" for snapshot "S2-1."
- Mount Point Name. A name of a mount point to which the file system identified by FS Name may be mounted in a root file system when restoring this NAS server.
- FS Internal UUID. A universally unique identifier of the file system FS Name used internally by the data storage system 116.
- FS External UUID. A universally unique identifier of the file system FS Name used when the file system is a replication or migration target.

Some of the information 210 in the searchable metadata element 184 may be provided for operational convenience rather than out of necessity. For instance, one may identify a particular NAS server version knowing only the NAS server UUID, or by knowing both the Parent NAS server UUID and the Version #. Other information may be helpful during restore operations and/or for supporting various types of queries. For example, administrators may query searchable metadata elements 184 based on any of the information 210. Querying based on Timestamp, for example, allows administrators to restore to a particular point in time, such as to get behind a known corruption event. The VTO translator 150 may associate searchable metadata elements 184 with respective snapshots in a variety of ways, such as in mapping metadata in the data store 180, in predefined storage regions, or in any suitable manner.

Figure 3:
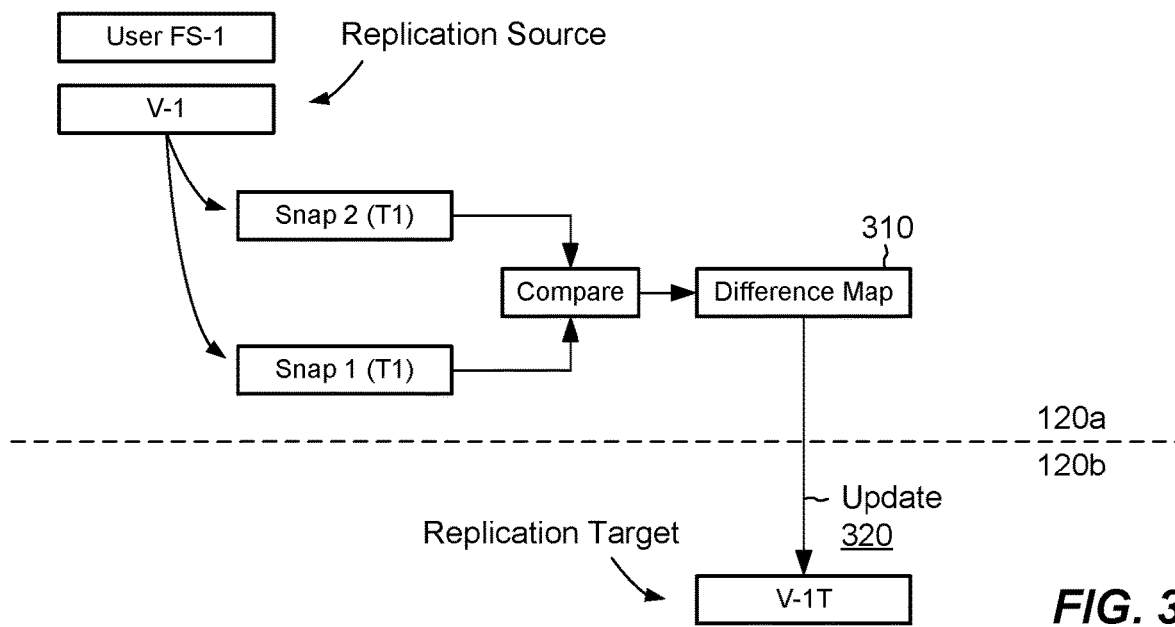
FIG. 3 is a flow diagram showing an example snapshot-shipping operation used to replicate a NAS server volume to the cloud.

FIG. 3 shows an example arrangement for performing replication between a locally backed volume 142 and a cloud-backed volume 146. Here, locally-backed volume V-1 (FIG. 1), which backs user file system FS-1, acts as a replication source, and cloud-backed volume V-1T acts as a replication target. Replication in this example proceeds using snapshot shipping. For example, the replication manager 140 directs node 120*a* to take a first snap (Snap 1) at time T1 and to take a second snap (Snap 2) at time T2, which is later than T1. Here, we assume that Snap 1 reflects a current state of the replication target, V-1T. The node 120*a* then compares these snaps to generate a difference map 310, which identifies differences between Snap 1 and Snap 2 and thus reflects changes in V-1 between times T1 and T2. Node 120*a* sends the difference map 310 to node 120*b*, where the VTO translator 150 performs an update 320 to apply the changes indicated in the difference map 310 to the replication target, V-1T. Once the changes have been applied, V-1T is current with V-1 as of time T2.

Operation may proceed indefinitely in a like manner. For example, another snap (not shown) is taken at time T3, which is later than T2. The new snap is compared with Snap 2 to create a new difference map, and the new difference map is sent to the target, where another update makes V-1T current with source V-1 as of time T3.

In an example, each of the replication sessions 144 employs snapshot-shipping replication, such as that described in connection with FIG. 3. An example technology for performing snapshot-shipping replication is Replicator V2, which is available from Dell EMC of Hopkinton, Mass. One should appreciate that other replication technologies may be used, such as continuous replication, and that the user of snapshot shipping is merely an example.

Figure 4:
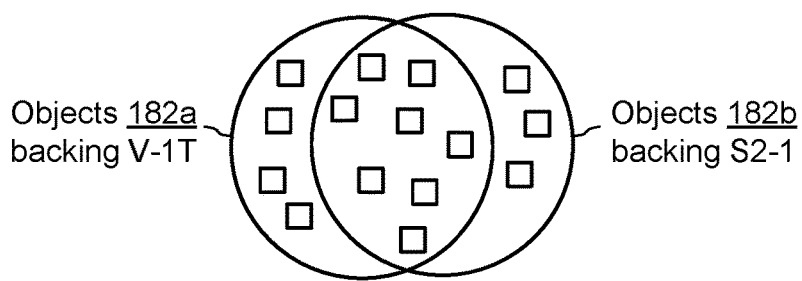
FIG. 4 is a diagram showing example sharing relationships between a cloud-backed volume and a snapshot of the cloud-backed volume.

FIG. 4 shows example sharing relationships among objects 182 in the cloud-backed data store 180. In this simplified diagram, which is intended merely to be instructive of the general concepts, it is seen that objects 182*a* back the cloud-backed volume V-1T, whereas objects 182*b* back snap S2-1 of the volume V-1T. Thus, the cloud-backed volume and its snapshot share many of the same objects, such that duplication of data storage is avoided. Here, VTO translator 150 maintains the sharing relationships, which may be persisted in mapping metadata within the data store 180. The indicated sharing relationships not only reduce the amount of cloud storage required to back different versions of a volume, but they also avoid the need for synthetic backup (i.e., reconciling full backups with incremental backups) during restore operations, as the data store 180 persists each snapshot as a complete object.

Figure 5:
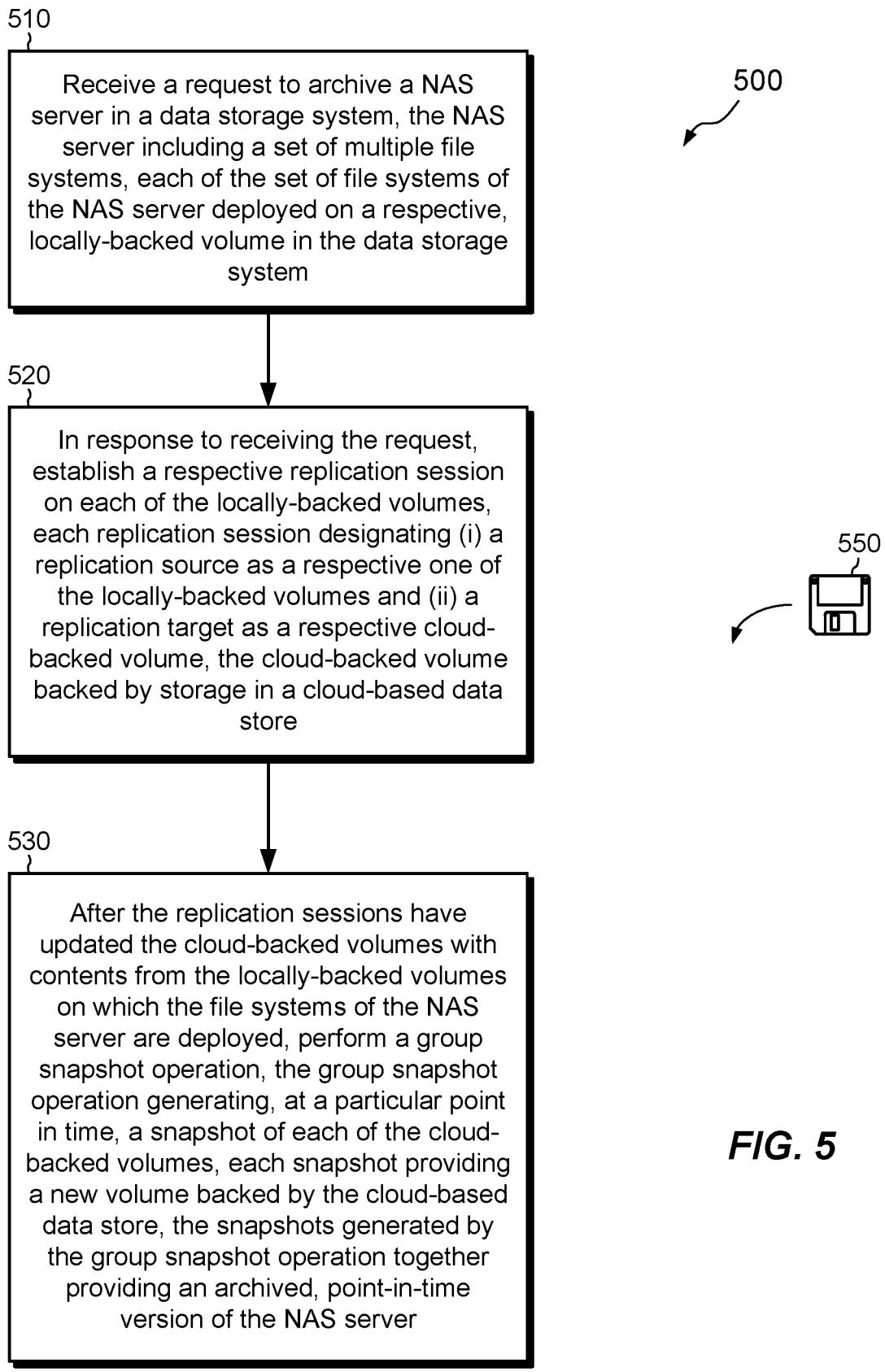
FIG. 5 is a flow chart showing an example method of archiving NAS servers in the cloud.

FIG. 5 shows an example method 500 that may be carried out in connection with the environment 100. The method 500 is typically performed, for example, by the software constructs described in connection with FIG. 1, which reside in the memories 130*a* and 130*b* of the respective nodes 120*a* and 120*b* and are run by the respective sets of processing units 124*a* and 124*b*. The various acts of method 500 may be ordered in any suitable way. Accordingly, embodiments may be constructed in which acts are performed in orders different from that illustrated, which may include performing some acts simultaneously.

At 510, a request 106 is received to archive a NAS server (e.g., NS-1) in a data storage system 116. The NAS server includes a set of multiple file systems, such as Config-FS, User FS-1, and User FS-2. Each of the set of file systems of the NAS server is deployed on a respective, locally-backed volume in the data storage system 116, such as V-C, V-1, or V-2. The request 106 may be received from an administrative machine 104, from some other machine, or from within the data storage system 116 itself.

At 520, in response to receiving the request 106, a respective replication session 144 is established on each of the locally-backed volumes 142. Each replication session designates (i) a replication source as a respective one of the locally-backed volumes 142 and (ii) a replication target as a respective cloud-backed volume 146, such as V-CT, V-1T, or V-2T, which is backed by storage in a cloud-based data store 180.

At 530, after the replication sessions 144 have updated the cloud-backed volumes 146 with contents from the locally-backed volumes 142 on which the file systems of the NAS server are deployed, a group snapshot operation 160(1) is performed. The group snapshot operation 160(1) generates, at a particular point in time, a snapshot of each of the cloud-backed volumes 146. Each snapshot provides a new volume backed by the cloud-based data store 180. The snapshots, e.g., S1-C, S1-1, and S1-2, generated by the group snapshot operation 160(1) together provide an archived, point-in-time version of the NAS server.

An improved technique has been described for archiving NAS servers. The technique includes replicating multiple locally-backed volumes 142, which support respective file systems of a NAS server, to respective cloud-backed volumes 146 backed by a cloud-based data store 180. After replication has updated the cloud-backed volumes 146 with contents from the locally-backed volumes 142, the technique further includes performing a group snapshot operation 160(1) on the cloud-backed volumes 146. The group snapshot operation 160(1) creates a point-in-time version of the cloud-backed volumes 146, which provides a replica of the NAS server archived in the cloud.

Section II: Restoring NAS Servers from the Cloud

Having described a technique for archiving NAS servers to the cloud, attention is now turned to an improved technique for restoring NAS servers that have been archived to the cloud. The restoring technique includes querying, by a local data storage system, a cloud-based data store to identify a set of cloud-backed volumes that belong to an archived NAS server to be restored. The technique further includes rendering the identified cloud-backed volumes as respective writable LUNs (Logical UNits), accessing the writeable LUNs by the local data storage system, and processing data on the writeable LUNs to operate file systems of the NAS server that are stored in the writeable LUNs. Restoring a NAS server may be performed as part of a disaster recovery operation, as part of a roll-back operation, as part of a process for distributing content, or for any other reason. Although the restoring technique is described in the context of the particular archiving technique disclosed in Section I, the restoring technique is not limited to the archiving technique of Section I, which should be regarded merely as an example.

Figure 6:
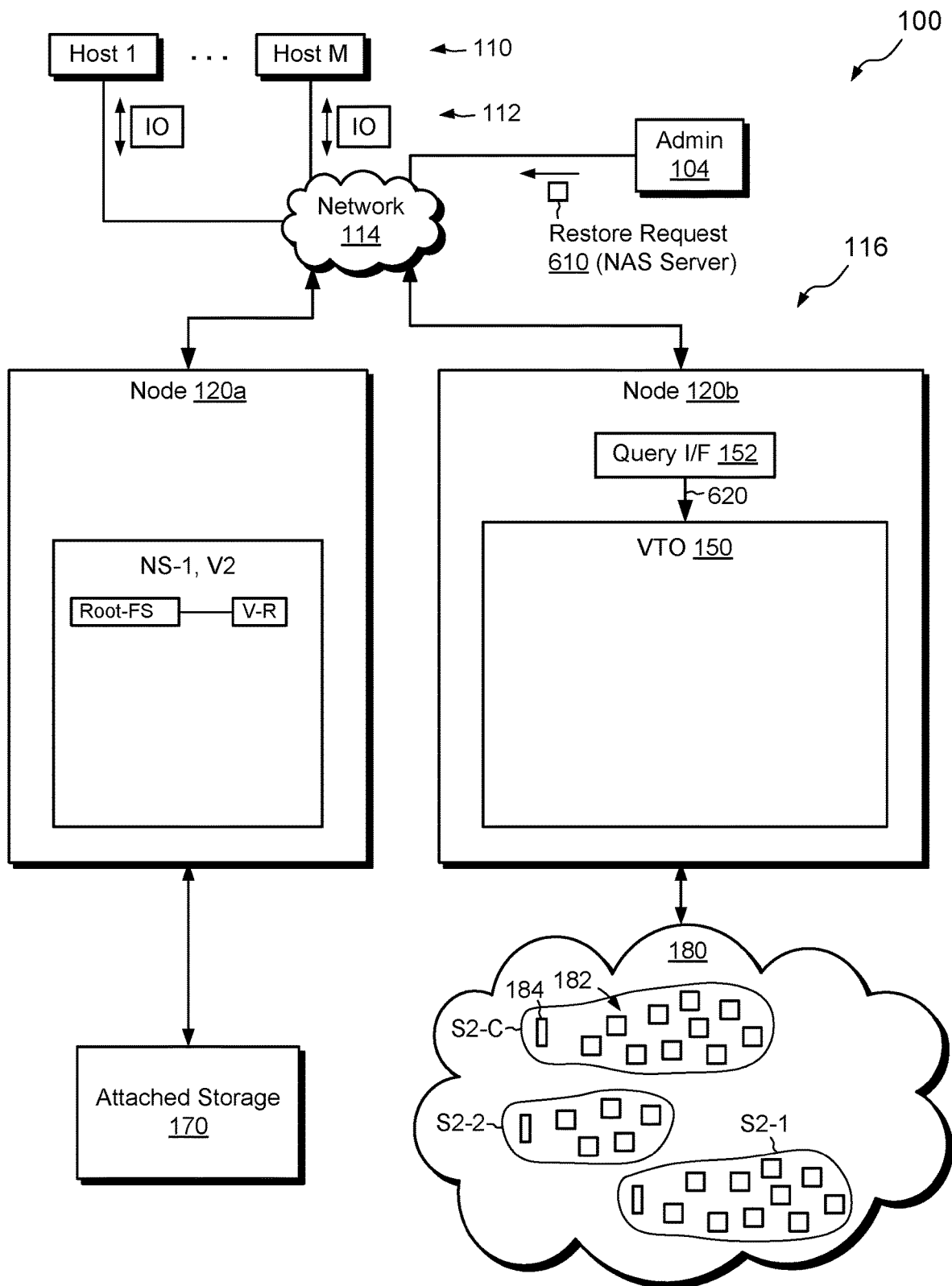
FIGS. 6-8 are block diagrams of the environment of FIG. 1 during different parts of a NAS server restore operation.
Figure 7:
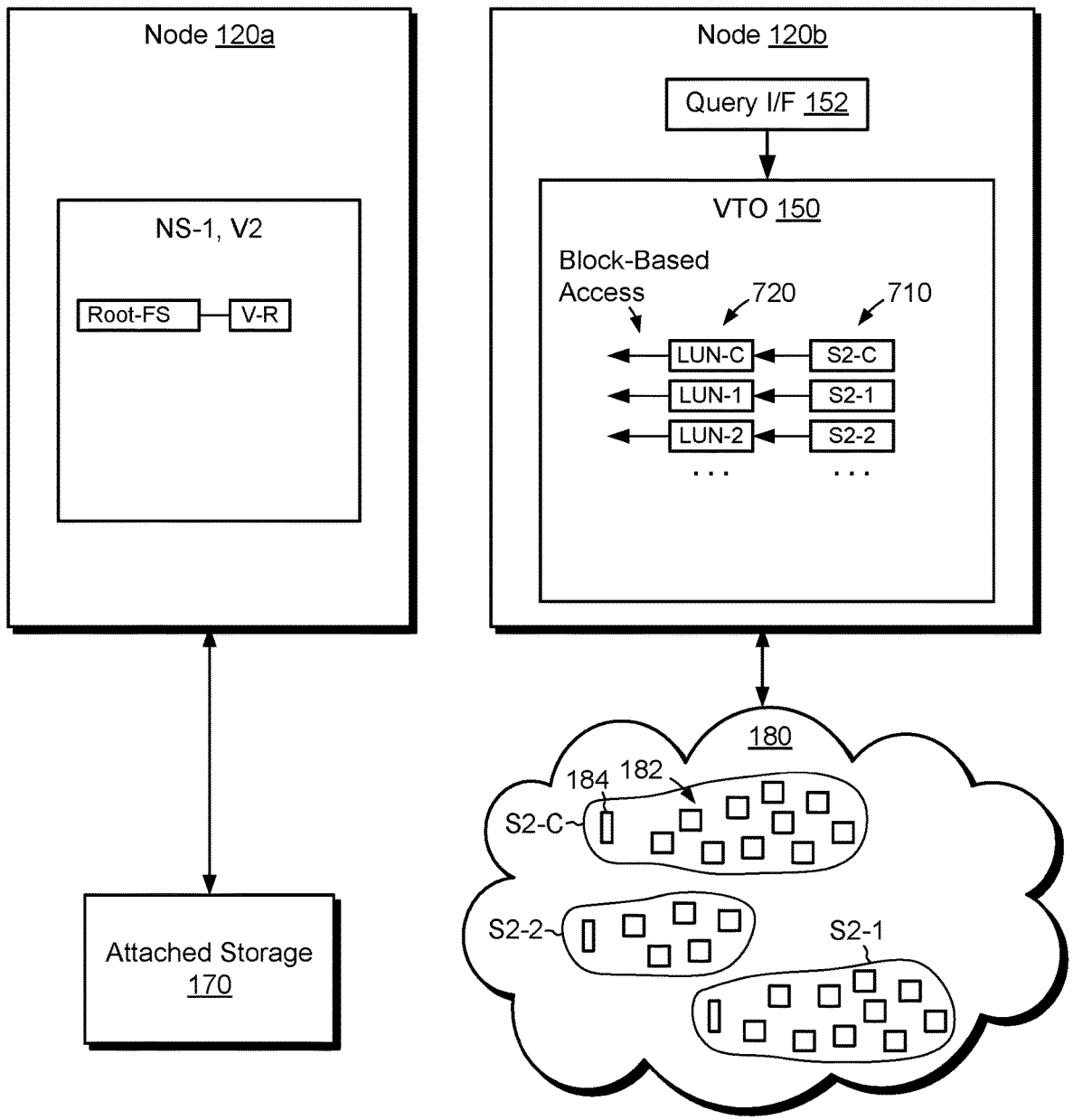
Figure 8:
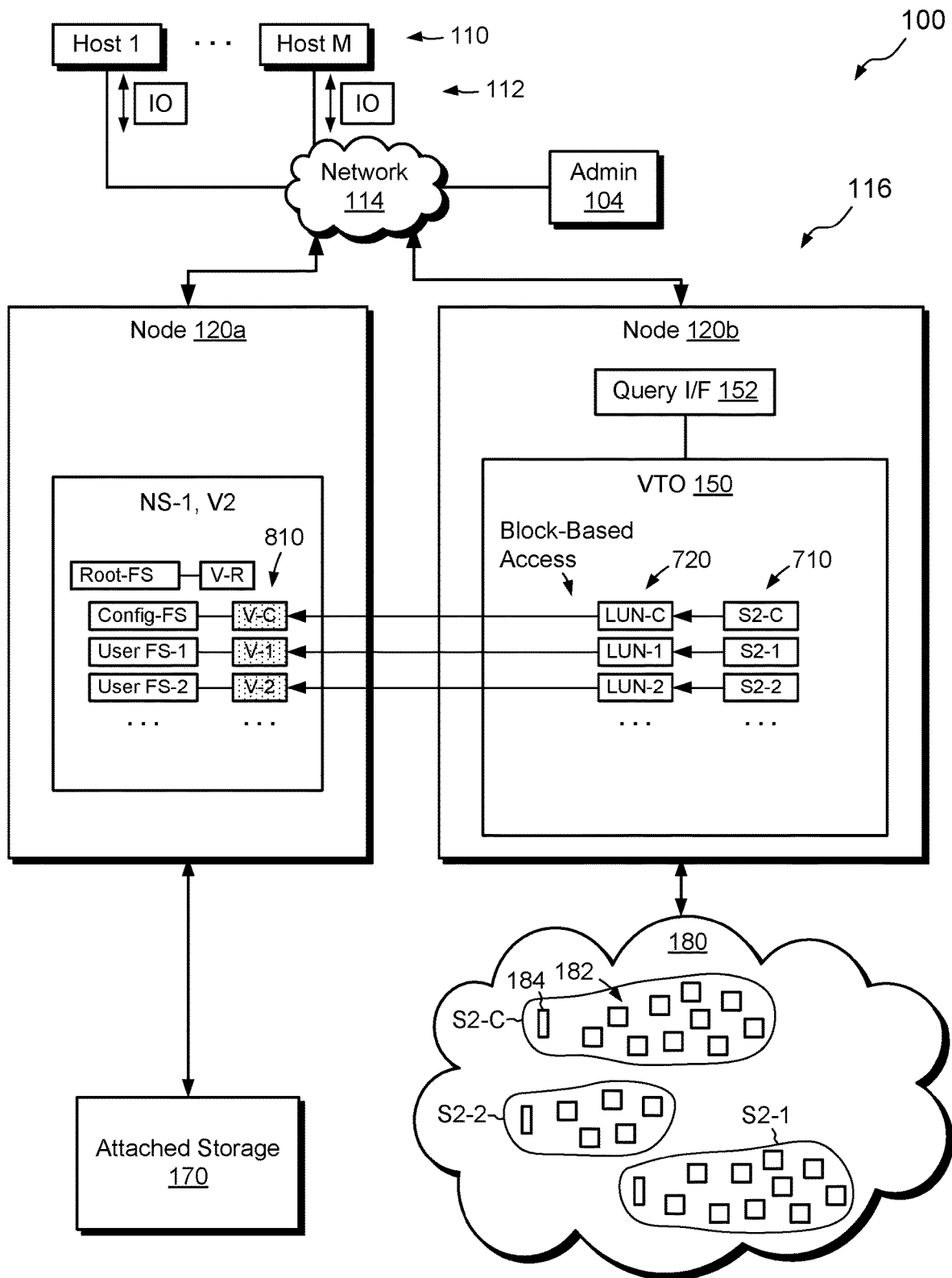

FIG. 6 shows and example environment in which the improved technique for restoring NAS servers can be practiced. In this example, the restoring technique is performed by the same data storage system 116 as described in connection with FIG. 1, where a NAS server is being archived. This is merely an example, as the data storage system used for restoring a NAS server may be different from the one used for archiving; indeed, restoring by a different data storage system may be the more common scenario. Here, we assume that the data storage system 116 is configured the same way as described in connection with FIG. 1 and includes the same components. In this example, however, NAS server NS-1 does not initially run on node 120a.

In example operation, administrative machine 104 issues a restore request 610 to the data storage system 116, identifying a particular NAS server to be restored. For example, the request 610 may specify a NAS server UUID, or it may specify a Parent NAS server UUID and a Version Number (see FIG. 2). Alternatively, the data storage system 116 may itself issue the restore request 610. Here, we assume that the request 610 specifies the UUID of VS-1 and a Version Number of "2," i.e., one of the versions of NS-1 having been archived above.

In response to the restore request 610, node 120a allocates space for the new NAS server (NS-1, V2) and creates a new root file system "Root FS" for the new NAS server. For example, node 120a creates a new locally-backed volume V-R, backed by attached storage 170, and formats the root file system on the new volume. Also in response to the restore request 610, query interface 152 constructs a query 620, e.g., based on the criteria received in the restore request 610, and sends the query 620 to VTO translator 150. The query 620 directs the VTO translator 150 to search metadata elements 184 (FIG. 2) in the data store 180. For example, the request 610 specifies "NS-1" as the Parent NAS Server UUID and "2" as the Version Number. The query 620 then directs the VTO translator 150 to find all metadata elements 184 that identify the specified "NS-1" as Parent NAS Server UUID and "2" as Version Number in the appropriate fields. The query 620 returns a list of metadata elements 184, each of which is associated with a respective volume in the data store 180.

Here, the query 620 returns a list of metadata elements 184 that the VTO translator 150 associates with VS-1, Version 2, which correspond to snapshot volumes S2-C, S2-1, and S2-2. The data store 180 associates each of these snapshots with a respective set of objects, which store data of the respective snapshots.

FIG. 5 shows a next phase of restore activities. Here, VTO translator 150 identifies snapshot volumes 710 (i.e., S2-C, S2-1, and S2-2) based on the contents returned from query 620. In some examples, the snapshot volumes 710 are read-only volumes. Where this is the case, the VTO translator 150 renders the snapshot volumes 710 as writeable LUNs 720, i.e., LUN-C, LUN-1, and LUN-2. For example, the VTO translator 150 creates read-write clones of the read-only snapshot volumes 710. The VTO translator 150 then exposes the writeable LUNs 720 using a block-based protocol, such as iSCSI or Fibre Channel. Alternatively, if the snapshot volumes 710 are already read-write, the VTO translator 150 merely exposes the snapshot volumes 710 as writeable LUNs directly.

FIG. 6 shows another phase of restore activities. Here, node 120a discovers the writeable LUNs 720 and constructs local volumes 810 (i.e., V-C, V-1, and V-2) backed by LUNs 720. The local volumes 810 may provide a pass-through operation, as they merely provide a local reference to the writeable LUNs 720, which are backed by the cloud-based data store 180. One should appreciate that the construction of local volumes 810 need not involve any copying of data from writeable LUNs 720. Rather, the storage backing local volumes 810 resides in the data store 180.

Node 120a then instantiates the respective file systems, Config-FS, User FS-1, and User FS-2, from the respective volumes V-C, V-1 and V-2. For example, node 120a reads data and metadata from the local volumes 810 and creates in-memory constructs for accessing files and directories in the file systems.

Restore operations may further include reconstituting contents of Root-FS based on the local environment and based on contents of Config-FS, User FS-1, and User FS-2, such that Root-FS mimics the original root file system of NS-1 (recall that the root file system was not archived). These activities may include configuring mount points and rebuilding a file system database (FSDB), which tracks information about user file systems that belong to the restored NAS server. For example, the restore operations may iterate over all metadata elements 184 returned in response to the query 620, retrieve information about each user file system from the metadata elements 184, and store the retrieved information in the FSDB. Additional information about FSDBs may be found in co-pending U.S. application Ser. No. 15/664,366, filed Jul. 31, 2017, and entitled "MANAGING DATA USING NETWORK ATTACHED STORAGE (NAS) CLUSTER," the contents and teachings of which are incorporated herein by reference. The incorporated application further discloses an example data storage cluster in which the archiving and restoring techniques as described herein may be performed. For example, the node 120a may be configured as a data node as described in the incorporated application, and the node 120b may be configured as a cluster manager node as described in the incorporated application, or as some other node in the NAS cluster.

With the file systems of NS-1, V2 fully restored, node 120a may operate this NAS server in the usual manner. For example, node 120a may read network settings from Root-FS and/or Config-FS, start a network server with the appropriate settings, and service file-based I/O requests 112 arriving from hosts 110 for performing reads and/or writes of the user file systems FS-1 and FS-2. Although not specifically shown, the data storage system 116 employ a local cache for writeable LUNs 720, e.g., to reduce the number of calls required into the cloud-based data store 180 for reading and/or writing data. The illustrated arrangement thus enables the data storage system 116 to operate a NAS server with only a minimal complement of attached storage 170, as the data of the NAS server are being accessed from the cloud.

In some embodiments, the data storage system 116 may make local copies of cloud-backed volumes. For example, in cases where high-speed or offline access to data is desired, the data storage system 116 may download the data of LUN-C, LUN-1, and LUN-2 to the attached storage 170, and operate the NAS server NS-1, V2 from the local storage 170.

Figure 9:
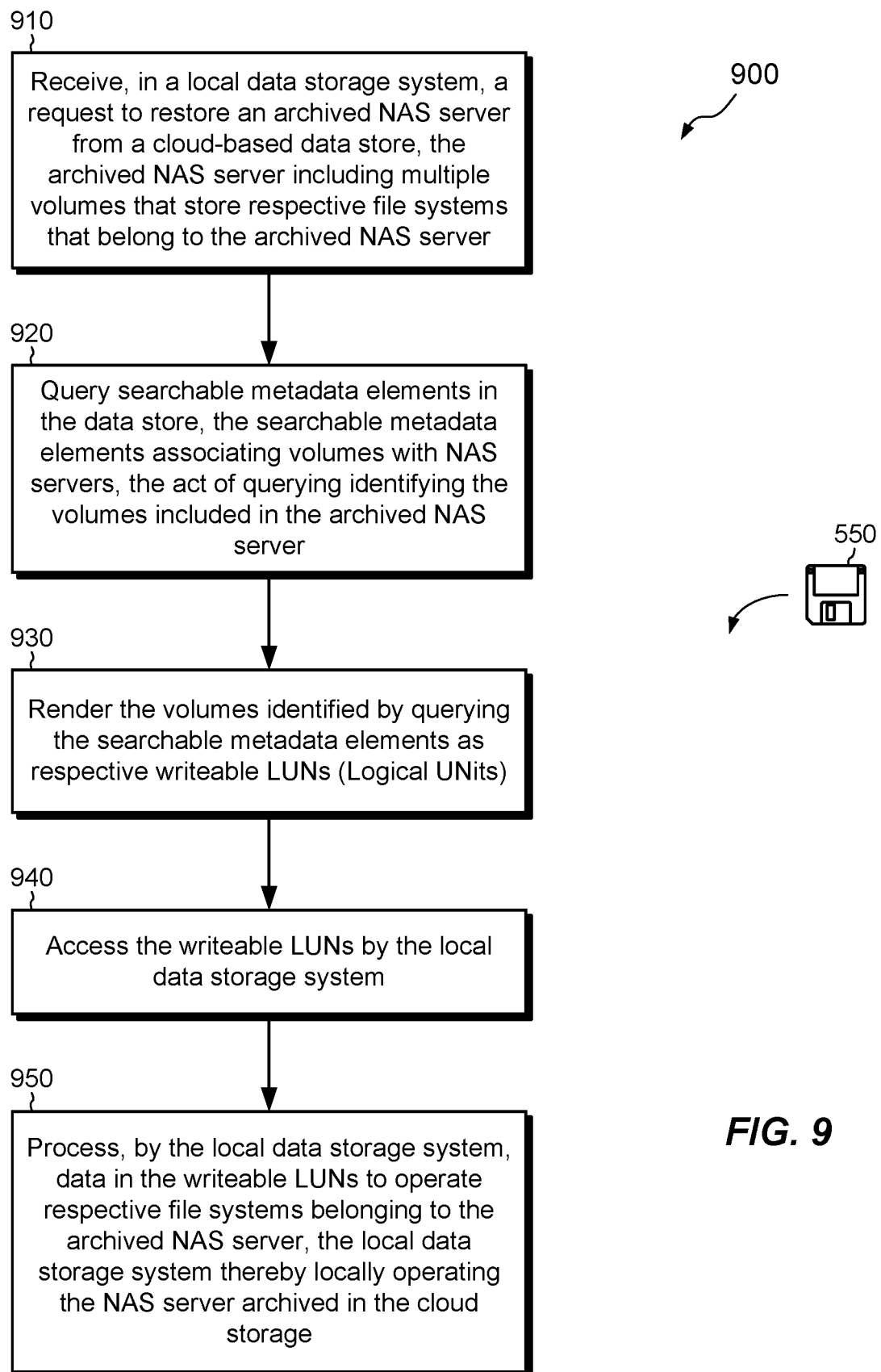
FIG. 9 is a flowchart showing an example method of restoring a NAS server from the cloud.

FIG. 9 shows an example method 900 for restoring a NAS server from a cloud-based data store. The method 900 is typically performed, for example, by the software constructs described in connection with FIGS. 1 and 6, which reside in the memories 130a and 130b of the respective nodes 120a and 120b and are run by the respective sets of processing units 124a and 124b. The various acts of method 900 may be ordered in any suitable way. Accordingly, embodiments may be constructed in which acts are performed in orders different from that illustrated, which may include performing some acts simultaneously.

At 910, a request 610 is received in a local data storage system 116 to restore an archived NAS server, e.g., NS-1, V2, from a cloud-based data store 180. The archived NAS server includes multiple volumes 710 that store respective file systems that belong to the archived NAS server. The following acts are performed in response to receiving the request:

At 920, searchable metadata elements 184 are queried in the data store 180. The searchable metadata elements associate volumes with NAS servers, and the act of querying identifies the volumes 710 included in the archived NAS server NS-1, V2.

At 930, the volumes 710 identified by querying the searchable metadata elements 184 are rendered as respective writeable LUNs (Logical UNits) 720. For example, the VTO translator 150 directs the data store 180 to generate writeable LUNs 720 as clones of volumes 710, which may be read-only. If the volumes 710 are inherently read-write, then this act merely includes presenting the volumes 710 as the writeable LUNs 720.

At 940, the local data storage system 116 accesses the writeable LUNs 720. For example, the VTO translator 150 running on node 120b makes the writeable LUNs 720 accessible using a block-based protocol, and node 120a accesses the writeable LUNs 720 using the block-based protocol.

At 950, the local data storage system 116 processes data in the writeable LUNs to operate respective file systems belonging to the archived NAS server. The local data storage system 116 thereby locally operates the NAS server archived in the cloud storage 180.

In some examples, the method 900 may be performed as part of a disaster recovery operation, e.g., to resume operation of an archived NAS server after a storage system that initially hosted that NAS server becomes unavailable, such as following a site failure. The method 900 may also be performed as part of a content distribution procedure. For example, a source data storage system, on which content of a NAS server is regularly updated, may perform regular archives of the NAS server to the cloud-based data store 180, such as every day, where each update captures any changes made to the NAS server over the course of the previous day. Any number of remote systems may each perform the restore method 900 to enable local access to the most recently archived version of the NAS server. Such restore methods 900 may also be operated daily, or at any other suitable interval, to provide access to current data. As no local copy of the data of the NAS server need be provided, such remote systems may be configured with a minimal complement of storage drives.

An improved technique has been described for restoring NAS servers that have been archived to the cloud. The technique includes querying, by a local data storage system 116, a cloud-based data store 180 to identify a set of cloud-backed volumes 710 that belong to an archived NAS server to be restored. The technique further includes rendering the identified cloud-backed volumes as respective writable LUNs (Logical UNits) 720, accessing the writeable LUNs 720 by the local data storage system 116, and processing data on the writeable LUNs 720 to operate file systems of the NAS server that are stored in the writeable LUNs 720.

Having described certain embodiments, numerous alternative embodiments or variations can be made. Further, although features are shown and described with reference to particular embodiments hereof, such features may be included and hereby are included in any of the disclosed embodiments and their variants. Thus, it is understood that features disclosed in connection with any embodiment may be included with any other embodiment.

Further still, the improvement or portions thereof may be embodied as a computer program product including one or more non-transient, computer-readable storage media, such as a magnetic disk, magnetic tape, compact disk, DVD, optical disk, flash drive, solid state drive, SD (Secure Digital) chip or device, Application Specific Integrated Circuit (ASIC), Field Programmable Gate Array (FPGA), and/or the like (shown by way of example as medium 550 in FIGS. 5 and 9). Any number of computer-readable media may be used. The media may be encoded with instructions which, when executed on one or more computers or other processors, perform the process or processes described herein. Such media may be considered articles of manufacture or machines, and may be transportable from one machine to another.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Further, although ordinal expressions, such as "first," "second," "third," and so on, may be used as adjectives herein, such ordinal expressions are used for identification purposes and, unless specifically indicated, are not intended to imply any ordering or sequence. Thus, for example, a "second" event may take place before or after a "first event," or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Although certain embodiments are disclosed herein, it is understood that these are provided by way of example only and that the invention is not limited to these particular embodiments.

Those skilled in the art will therefore understand that various changes in form and detail may be made to the embodiments disclosed herein without departing from the scope of the invention.

What is claimed is:

1. A method of archiving NAS (network attached storage) servers, the method comprising:
    receiving a request to archive a NAS server in a data storage system, the NAS server including a set of multiple file systems, each of the set of file systems of the NAS server deployed on a respective, locally-backed volume in the data storage system;
    in response to receiving the request, establishing a respective replication session on each of the locally-backed volumes, each replication session designating (i) a replication source as a respective one of the locally-backed volumes and (ii) a replication target as a respective cloud-backed volume, the cloud-backed volume backed by storage in a cloud-based data store; and
    after the replication sessions have updated the cloud-backed volumes with contents from the locally-backed volumes on which the file systems of the NAS server are deployed, performing a group snapshot operation, the group snapshot operation generating, at a particular point in time, a snapshot of each of the cloud-backed volumes, each snapshot providing a new volume backed by the cloud-based data store, the snapshots generated by the group snapshot operation together providing an archived, point-in-time version of the NAS server,
    wherein each of the replication sessions is a snapshot-shipping replication session configured to update a respective cloud-backed volume with contents of a respective locally-backed volume on a periodic basis.

2. The method of claim 1, further comprising, after updating the cloud-backed volumes with new contents from the locally-backed volumes, performing a second group snapshot operation, the second group snapshot operation generating, at a later point in time, a second snapshot of each of the cloud-backed volumes, the second snapshots generated by the second group snapshot operation together providing a second archived, point-in-time version of the NAS server.

3. The method of claim 2, further comprising storing a searchable metadata element for each snapshot, each searchable metadata element associated with a respective snapshot and identifying a NAS server and version, wherein different versions indicate different group snapshot operations.

4. The method of claim 3, wherein each of the searchable metadata elements includes a NAS server identifier and a version number, and wherein the searchable metadata elements for all snapshots taken for a NAS server during a single group snapshot operation identify the same NAS server identifier and the same version number.

5. The method of claim 4, wherein each searchable metadata element for a snapshot further includes:
    a timestamp that indicates a time when the snapshot was generated; and
    a name of the file system deployed upon the locally-backed volume that was replicated to the cloud-backed volume from which the snapshot was generated.

6. The method of claim 4, further comprising identifying a particular archived version of the NAS server by querying the searchable metadata elements based on NAS server identifier and version number.

7. The method of claim 3, wherein the data store organizes data in objects, and wherein the method further comprises storing the data of each snapshot generated during the first group snapshot operation as a respective set of objects in the data store.

8. The method of claim 7, further comprising maintaining data-sharing relationships in the data store, at least one of the cloud-backed volumes thus sharing data storage with a snapshot of that cloud-backed volume.

9. The method of claim 3, wherein performing an update to a cloud-backed volume based on changes to a locally-backed volume includes:
    taking a snap of the locally-backed volume acting as the replication source;
    calculating a difference map that identifies differences between the snap and a previous snap of the same locally-backed volume taken earlier;
    shipping the difference map to the replication destination, and
    updating the cloud-backed volume to include changes identified in the difference map.

10. The method of claim 9, wherein the replication sessions are managed by a replication manager in the data storage system, and wherein the group snapshot operation and the second group snapshot operation are performed in response to requests from the replication manager.

11. The method of claim 10, further comprising the replication manager timing the requests to perform the group snapshot operations to occur after one set of snapshot shipping updates to the cloud-backed volumes finishes but prior to another set of snapshot shipping updates to the cloud-backed volumes beginning.

12. A computerized apparatus, comprising control circuitry constructed and arranged to:
    receive a request to archive a NAS server in a data storage system, the NAS server including a set of multiple file systems, each of the set of file systems of the NAS server deployed on a respective, locally-backed volume in the data storage system;
    in response to receiving the request, establish a respective replication session on each of the locally-backed volumes, each replication session designating (i) a replication source as a respective one of the locally-backed volumes and (ii) a replication target as a respective cloud-backed volume, the cloud-backed volume backed by storage in a cloud-based data store; and after the replication sessions have updated the cloud-backed volumes with contents from the locally-backed volumes on which the file systems of the NAS server are deployed, perform a group snapshot operation, the group snapshot operation generating, at a particular point in time, a snapshot of each of the cloud-backed volumes, each snapshot providing a new volume backed by the cloud-based data store, the snapshots generated by the group snapshot operation together providing an archived, point-in-time version of the NAS server, wherein each of the replication sessions is a snapshot-shipping replication session configured to update a respective cloud-backed volume with contents of a respective locally-backed volume on a periodic basis.

13. A computer program product including a set of non-transitory, computer-readable media having instructions which, when executed by control circuitry of a computerized apparatus, cause the computerized apparatus to perform a method of archiving NAS (network attached storage) servers, the method comprising:

receiving a request to archive a NAS server in a data storage system, the NAS server including a set of multiple file systems, each of the set of file systems of the NAS server deployed on a respective, locally-backed volume in the data storage system;

in response to receiving the request, establishing a respective replication session on each of the locally-backed volumes, each replication session designating (i) a replication source as a respective one of the locally-backed volumes and (ii) a replication target as a respective cloud-backed volume, the cloud-backed volume backed by storage in a cloud-based data store; and after the replication sessions have updated the cloud-backed volumes with contents from the locally-backed volumes on which the file systems of the NAS server are deployed, performing a group snapshot operation, the group snapshot operation generating, at a particular point in time, a snapshot of each of the cloud-backed volumes, each snapshot providing a new volume backed by the cloud-based data store, the snapshots generated by the group snapshot operation together providing an archived, point-in-time version of the NAS server, wherein each of the replication sessions is a snapshot-shipping replication session configured to update a respective cloud-backed volume with contents of a respective locally-backed volume on a periodic basis.

14. The computer program product of claim 13, wherein the method further comprises, after updating the cloud-backed volumes with new contents from the locally-backed volumes, performing a second group snapshot operation, the second group snapshot operation generating, at a later point in time, a second snapshot of each of the cloud-backed volumes, the second snapshots generated by the second group snapshot operation together providing a second archived, point-in-time version of the NAS server.

15. The computer program product of claim 14, wherein the method further comprises storing a searchable metadata element for each snapshot, each searchable metadata element associated with a respective snapshot and identifying a NAS server and version, wherein different versions indicate different group snapshot operations.

16. The computer program product of claim 15, wherein the data store organizes data in objects, and wherein the method further comprises storing the data of each snapshot generated during the first group snapshot operation as a respective set of objects in the data store.

17. The computer program product of claim 16, wherein the method further comprises maintaining data-sharing relationships in the data store, at least one of the cloud-backed volumes thus sharing data storage with a snapshot of that cloud-backed volume.

18. The computer program product of claim 15, wherein performing an update to a cloud-backed volume based on changes to a locally-backed volume includes:

taking a snap of the locally-backed volume acting as the replication source;

calculating a difference map that identifies differences between the snap and a previous snap of the same locally-backed volume taken earlier;

shipping the difference map to the replication destination, and updating the cloud-backed volume to include changes identified in the difference map.

19. The computer program product of claim 18, wherein the replication sessions are managed by a replication manager in the data storage system, and wherein the group snapshot operation and the second group snapshot operation are performed in response to requests from the replication manager.

20. The computer program product of claim 19, wherein the method further comprises the replication manager timing the requests to perform the group snapshot operations to occur after one set of snapshot shipping updates to the cloud-backed volumes finishes but prior to another set of snapshot shipping updates to the cloud-backed volumes beginning.

* * * * *